US008555945B2

(12) United States Patent
Torres Martinez (10) Patent No.: US 8,555,945 B2
(45) Date of Patent: Oct. 15, 2013

(54) INSTALLATION FOR MANUFACTURING FIBRE STRINGERS FOR AEROSPACE STRUCTURES (76) Inventor: Manuel Torres Martinez, Navarra (ES)

(*) Notice: Subject to any disclaimer, the term of this patent is extended or adjusted under 35 U.S.C. 154(b) by 35 days.

(21) Appl. No.: 13/433,411

(22) Filed: Mar. 29, 2012

(65) Prior Publication Data

US 2013/0174396 A1 Jul. 11, 2013

(30) Foreign Application Priority Data

Jan. 10, 2012 (ES) .................................. 201200014

(51) Int. Cl.
*B29C 51/02* (2006.01)
*B29C 51/22* (2006.01)
*B29C 51/14* (2006.01)

(52) U.S. Cl.
USPC ........... 156/500; 156/512; 156/527; 425/345; 425/347; 425/353; 425/510; 425/519; 425/521

(58) Field of Classification Search
USPC .......... 156/500, 512, 566, 567, 568; 425/346, 425/347, 348 R, 349, 344, 345, 348 S, 350, 425/418, 423, 112, 510, 511, 518, 519, 520, 425/521
See application file for complete search history.

(56) References Cited

U.S. PATENT DOCUMENTS

| 2,390,803 | A | * | 12/1945 | Marschner ................... 76/107.1 |
|---|---|---|---|---|
| 3,670,555 | A | * | 6/1972 | Fredericks ................. 72/370.05 |
| 4,946,526 | A | * | 8/1990 | Petty-Galis et al. .......... 156/155 |
| 5,182,060 | A | * | 1/1993 | Berecz ............................. 264/70 |
| 5,538,589 | A | * | 7/1996 | Jensen et al. .................. 156/581 |
| 6,146,122 | A | * | 11/2000 | Kato ............................. 425/125 |
| 6,592,795 | B2 | * | 7/2003 | Kasai et al. ................... 264/241 |
| 6,976,835 | B1 | * | 12/2005 | Tucker ......................... 425/347 |
| 7,607,909 | B2 | * | 10/2009 | Bergami et al. ............... 425/186 |
| 2005/0023728 | A1 | * | 2/2005 | Benson et al. ................ 264/258 |
| 2005/0053762 | A1 | * | 3/2005 | Willden et al. ............... 428/122 |
| 2006/0231981 | A1 | * | 10/2006 | Lee et al. ...................... 264/320 |
| 2009/0320995 | A1 | * | 12/2009 | Menendez Martin et al. .............................. 156/201 |
| 2010/0059169 | A1 | * | 3/2010 | Lengsfeld et al. ............ 156/199 |
| 2010/0108246 | A1 | * | 5/2010 | Sanchez-Brunete Alvarez ........................ 156/245 |
| 2010/0200156 | A1 | * | 8/2010 | Lengsfeld et al. ............ 156/226 |

* cited by examiner

*Primary Examiner* — William Bell
(74) *Attorney, Agent, or Firm* — Lucas & Mercanti, LLP (57) ABSTRACT The present invention relates to an installation for manufacturing fiber stringers for aerospace structures formed by at least one swivel-mounted cylindrical carousel, peripherally incorporating a distribution of male configured tools and in relation to said carousel a bed capable of lateral movement, incorporating a distribution of female configured tools, a fiber strip applicator head for making fiber laminates on the male configured tools also being arranged in relation to the carousel, which allows making omega-shaped or T-shaped stringers by means of the interaction of each male configured tool of the carousel with a respective female configured tool of the bed.

9 Claims, 14 Drawing Sheets

INSTALLATION FOR MANUFACTURING FIBRE STRINGERS FOR AEROSPACE STRUCTURES

This Application claims the priority of Spanish Application No. P201200014, filed Jan. 10, 2012, the entire content of which is hereby incorporated by reference.

FIELD OF THE ART

The present invention relates to making aerospace structures on which reinforcement stringers are arranged, proposing an installation which allows manufacturing fibre stringers in a practical manner which can be used advantageously for said application.

STATE OF THE ART

Aerospace structures are made from panels of lightweight and resistant materials, such as aluminium or fibre laminates, said structures being formed, due to the lightweight specifications which they must meet, with a reduced thickness, providing them with reinforcement stringers fixed thereon for achieving the stiffness which in turn they must have.

Depending on the areas in which they have to be applied, inverted T-shaped and omega-shaped stringers which are usually manufactured from aluminium and fixed by riveting on the corresponding structures, are used for such purpose, which requires making the structures of application with thicknessed areas in the parts where the reinforcement stringers have to be fixed for being able to carry out the fixing riveting of the stringers with the effectiveness necessary for bearing the stresses which the structures will suffer in their functions of application.

This makes the manufacture of the mentioned aerospace structures and the incorporation of the reinforcement stringers thereon complex and costly, negatively affecting the cost of said structures as well as the ratio of the weight and strength characteristics thereof.

OBJECT OF THE INVENTION

According to the invention an installation which allows manufacturing fibre stringers in a practical manner is proposed, which stringers can be applied advantageously in aerospace structures, overcoming the drawbacks of conventional stringers used in said application.

The installation object of the invention comprises at least one rotating cylindrical carousel peripherally incorporating a distribution of male configured longitudinal tools, a bed which can move laterally being arranged in parallel in correspondence with said carousel, in which bed there is arranged a series of female configured tools reciprocal to male configured tools incorporated in the rotating carousel; whereas a fibre strip applicator head is arranged on one side of that carousel and bed assembly for applying fibre laminates on the male configured tools of the carousel, and a cutting head which allows milling and cutting said fibre laminates applied on the male configured tools is arranged on the other side; the male configured tools and the female configured tools being arranged in a moving assembly relative to each other which allows facing them and bringing them closer to each other for forming the fibre laminates applied on the male configured tools, forming omega-shaped or T-shaped stringers.

An installation is therefore obtained which allows automatically and continuously manufacturing omega-shaped or T-shaped fibre stringers which can be fixed by gluing on aerospace structures without having to be made with thicknessed areas for applying rivets, therefore improving the structural and formation features of the structures of application.

The installation can have two or more rotating carousels carrying male configured tools arranged longitudinally one after the other, and a bed in correspondence with said carousels provided with female configured tools which can be arranged in a common distribution with respect to all the carousels or in independent distributions with respect to each of the carousels.

The fibre strip applicator head and the cutting head, which are on both sides of the assembly formed by the carousels carrying the male configured tools and the bed incorporating the female configured tools, are mounted on longitudinal guides, being able to act on the entire length of the installation in relation to any of the carousels which are arranged thereon.

For making omega-shaped stringers, the female configured tools are formed by a profile which has a longitudinal channel according to the shape of the stringers to be made, whereas the male configured tools are formed by a longitudinally channelled profile in which a bar which that can be pushed outwardly by a pneumatic actuator is housed, such that by means of the thrust of said bar the fibre laminate applied on this tool, being adapted with respect to a corresponding female configured tool, is formed.

For making T-shaped stringers, the female configured tools are formed by two facing independent side parts forming an intermediate longitudinal channel, said parts being mounted on a base able to move closer to each other; whereas the male configured tools are formed by a block incorporating in the middle area of the front part a membrane that can be expanded by pneumatic thrust, such that the fibre laminate applied on this tool for making a stringer is cut into two halves by the longitudinal midline, the two halves later forming by means of expanding the membrane respective L-shaped parts on the respective side parts of a corresponding female configured tool for later attaching the two L-shaped parts, forming a T-shaped assembly, by means of the two parts of the female configured tool moving closer to each other.

The proposed installation therefore has advantageous features for producing stringers intended for reinforcing aerospace structures such as fuselage panels, wings, stabilizers, etc., acquiring its own identity and preferred character for said function.

DETAILED DESCRIPTION OF THE INVENTION

The object of the invention relates to an installation for making fibre stringers intended for being fixed on aerospace structures as reinforcement, the installation comprising at least one swivel-mounted cylindrical carousel (1) between respective end supports (2), and in parallel in relation to said carousel (1), a bed (3) mounted for lateral movement on cross-guides (4).

The carousel (1) peripherally incorporates a distribution of male configured tools (5) which by means of the rotation of said carousel (1) can be placed one after the other in a position facing the bed (3); while the bed (3) incorporates a distribution of female configured tools (6) which can be placed one after the other in a position facing each the carousel (1) by means of a lateral movement of said bed (3).

A fibre strip applicator head (8) intended for making fibre laminates (9) on the male configured tools (5) of the carousel (1) is mounted for movement on longitudinal guides (7) on a side of the assembly formed by the carousel (1) and the bed (3), for that purpose said head (8) incorporating, in addition to the necessary fibre strip application means, a rotary cutting system (not shown); while on the other side of the assembly formed by the carousel (1) and the bed (3), an ultrasonic cutting head (11) is mounted on longitudinal guides (10) by means of which the outer geometry of the fibre laminates (9) formed on the male configured tools (5) of the carousel (1) can be milled and said fibre laminates (9) can be cut.

Therefore, assemblies for making stringers from the fibre laminates (9) applied on the male configured tools (5) can be determined one after the other between each male configured tool (5) of the carousel (1) and a respective female configured tool (6) of the bed (3), omega-shaped or T-shaped stringers being able to be made according to the male configured tools (5) and the female configured tools (6) which are used.

In that sense, according to FIGS. 6A to 6F, to make omega-shaped stringers the female configured tools (6) arranged in the bed (3) are formed by a profile (12) determining a longitudinal channel (13) corresponding with that of the stringers to be made; while the male configured tools (5) arranged in the carousel (1) are formed by a profile (14) longitudinally determining a channel (15) in which there is housed a bar (16) that can be pushed outwardly by a pneumatic actuator (17), there being arranged in the front part a membrane (18) secured in a fixed manner by the side edges and pushed by the bar (16) in the central part when the bar exits the housing channel (15) in the profile (14).

Figure 6A:
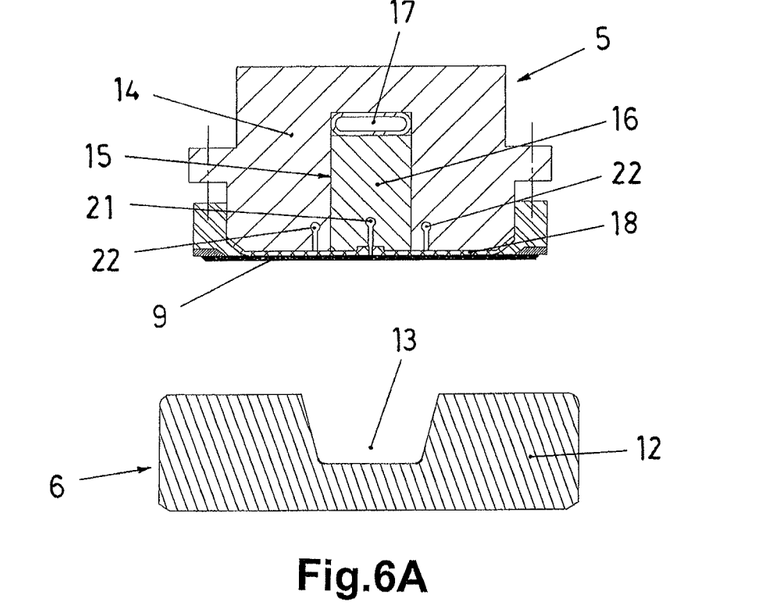
FIGS. 6A to 6F show a series of positions of the operating sequence for making an omega-shaped stringer between the corresponding male configured and female configured tools.

With this arrangement, the fibre laminate (9) intended for making the stringer to be made is applied on the front part of the male configured tool (5), covering the membrane (18) thereof, such that in the arrangement for making the stringer, said front part of the male configured tool (5) provided with the fibre laminate (9) is located facing a corresponding female configured tool (6) according to FIG. 6A.

Figure 6B:
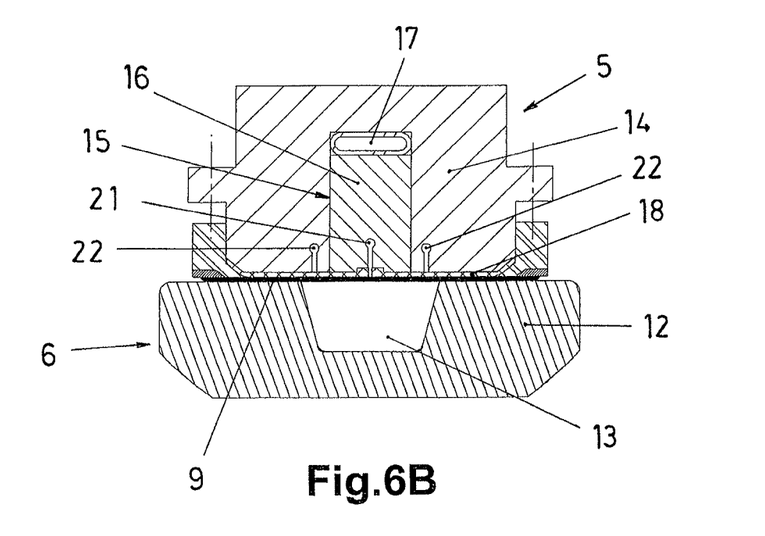
Figure 6C:
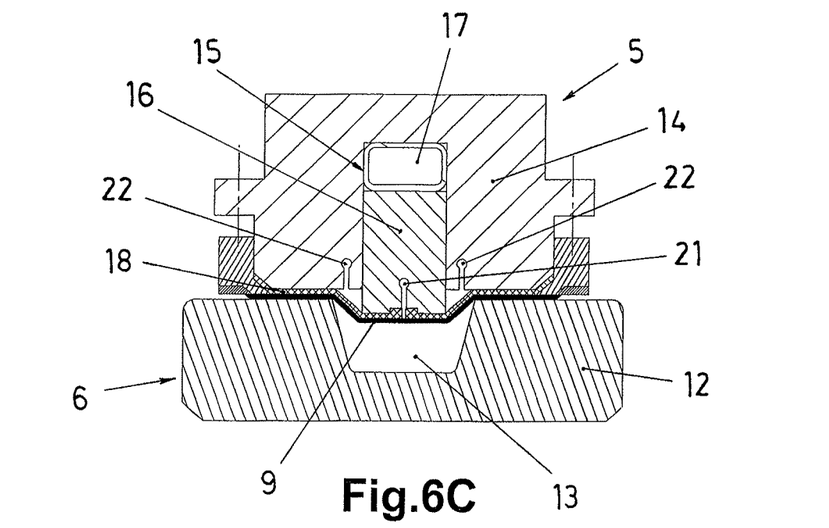

Once this is done, by means of moving the male configured tool (5) and the female configured tool (6) closer to each other, the fibre laminate (9) is trapped between them, as seen in FIG. 6B, the bar (16) then being thrust out of the profile (14) by means of the pneumatic actuator (17), as seen in FIG. 6C.

Figure 6D:
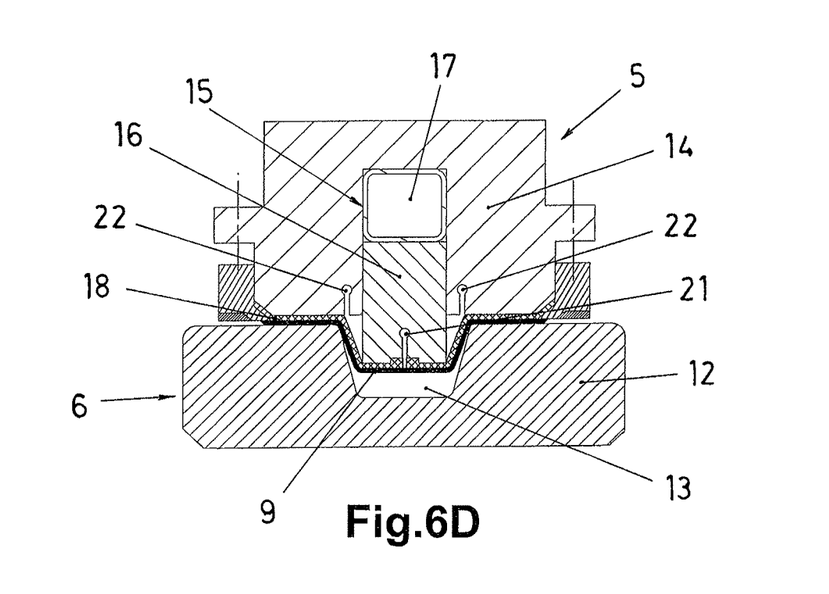
Figure 6E:
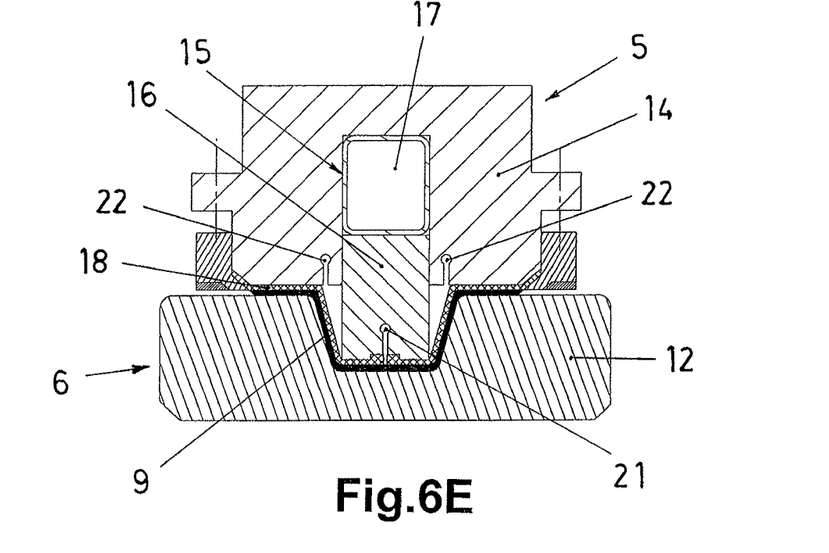

The bar (16) is moved by means of said thrust forcing the membrane (18), and by means of the latter, the fibre laminate (9), towards the inside of the channel (13) of the female configured tool (6), as seen in FIG. 6D, adapting the fibre laminate (9) to the shape of said channel (13), as seen in FIG. 6E.

Figure 6F:
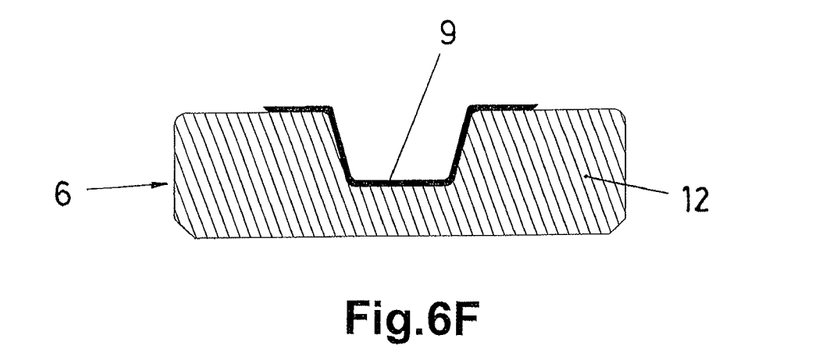
Figure 7A:
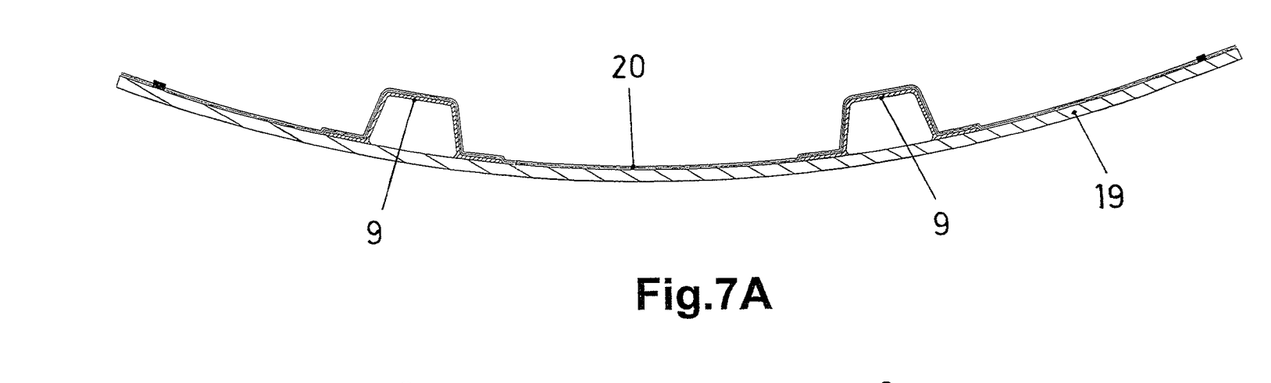
FIGS. 7A and 7B show a practical way of fixing the omega-shaped fibre stringers on a structure of application.
Figure 7B:
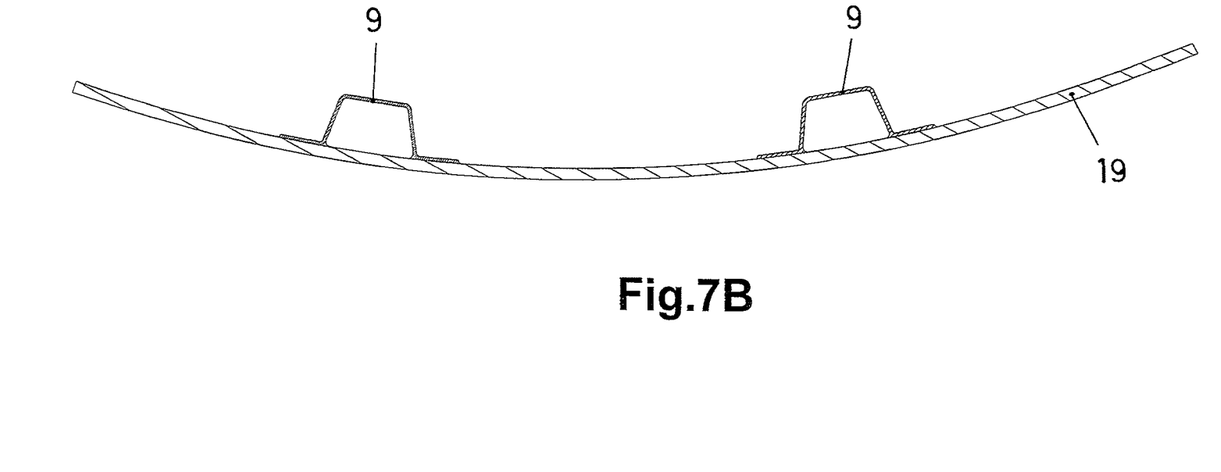

Then, separating the male configured tool (5) and the female configured tool (6) once more, the fibre laminate (9) is on the female configured tool (6) with the shape of the channel (13) thereof, as seen in FIG. 6F, said fibre laminate (9) with the shape thus adapted being able to be removed for being incorporated as a reinforcement stringer on a structure (19) of application where it can be glued, for example, by means of pressure with a sheet (20), as seen in FIG. 7A, applying a vacuum between said sheet (20) and the panel (19) of application, the sheet (20) later being removed after an autoclave resin curing process, as seen in FIG. 7B.

For the adequate forming of the fibre laminate (9), according to the mentioned process, the bar (16) of the male configured tool (5) has a conduit (21) communicating with a through hole through the membrane (18) through which a vacuum is applied for keeping the fibre laminate (9) on the front part of the thrust area for the forming; while the profile (14) has conduits (22) on the sides of the housing channel (15) of the thrust bar (16) through which compressed air is projected so that the assembly of the membrane (18) and the fibre laminate (19) adapt perfectly on the wall of the channel (13) of the female configured tool (6) in the forming phase.

For forming T-shaped stringers (FIGS. 8A to 8H), the female configured tools (6) which are arranged in the bed (3) are formed by two independent side parts (6.1, 6.2), determining a channel (23) between them, said side parts (6.1, 6.2) being movable mounted on a base (6.3) which allows bringing them closer to and separating them from each other, for example by means of moving the side part (6.1) carried by an actuator (24) with respect to the other side part (6.2) located in a fixed position; this is a non-limiting solution since both side parts (6.1 and 6.2) can also be moved by means of respective actuators(24).

Each of the side parts (6.1, 6.2) further incorporates, in the area where they face each other, an insert (25) which is held by means of an electromagnet (26).

The male configured tools (5) which are arranged in the carousel (1) are formed, in this case, by a block incorporating a membrane (27) in the middle area of the front part, the block having a conduit (28) in the central area through which pneumatic pressure can be injected to force the membrane (27) to expand forwards.

Figure 8A:
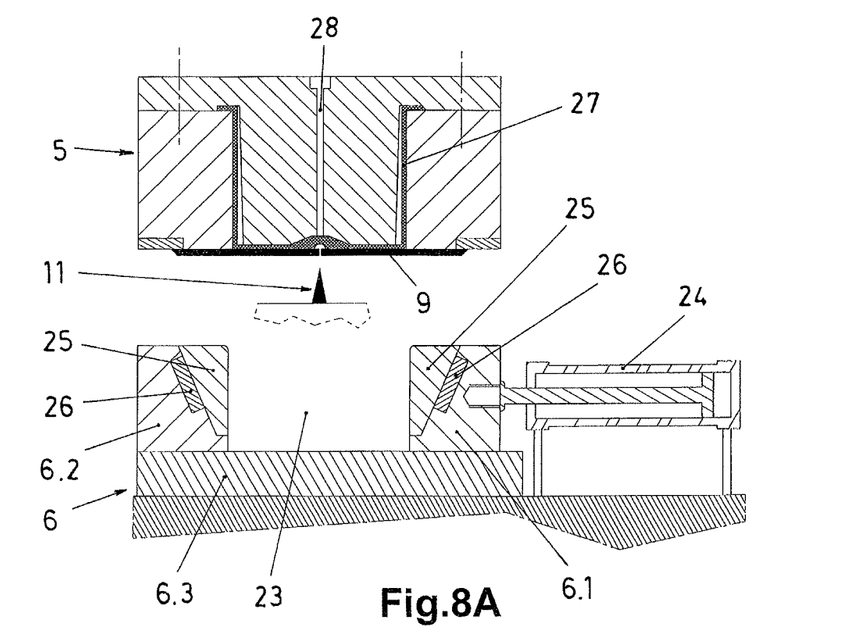
FIGS. 8A to 8H show a series of positions of the operating sequence for making a T-shaped stringer between the corresponding male configured tools and female configured tools.

With this arrangement, the fibre laminate (9) intended for making the stringer to be made is equally applied on the front area of the male configured tool (5) and said fibre laminate (9) is cut longitudinally in two halves by means of the cutting head (11), as shown in FIG. 8A.

Figure 8B:
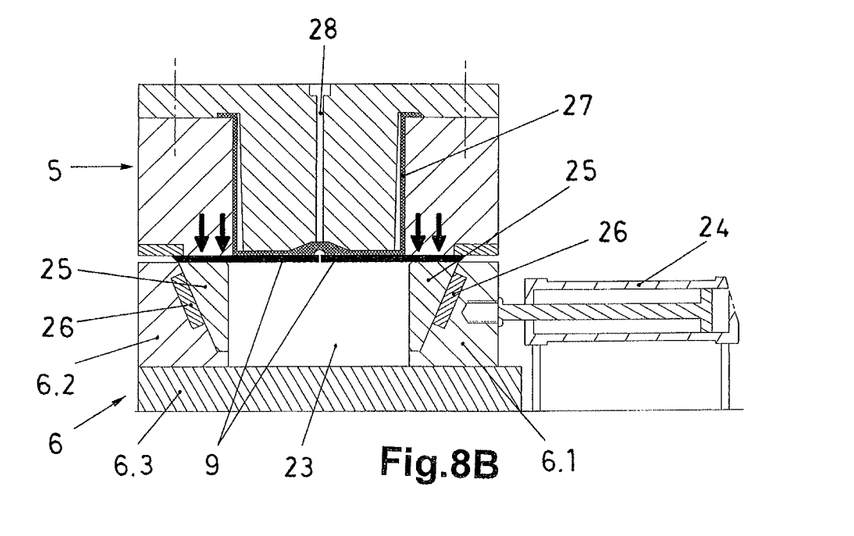

After dividing the fibre laminate (9) in two halves, the male configured tool (5) is located with the front part facing a corresponding female configured tool (6) and both tools (5 and 6) are moved closer to each other, whereby the side areas of the fibre laminate (9) are trapped between said tools (5 and 6), as seen in FIG. 8B.

Figure 8C:
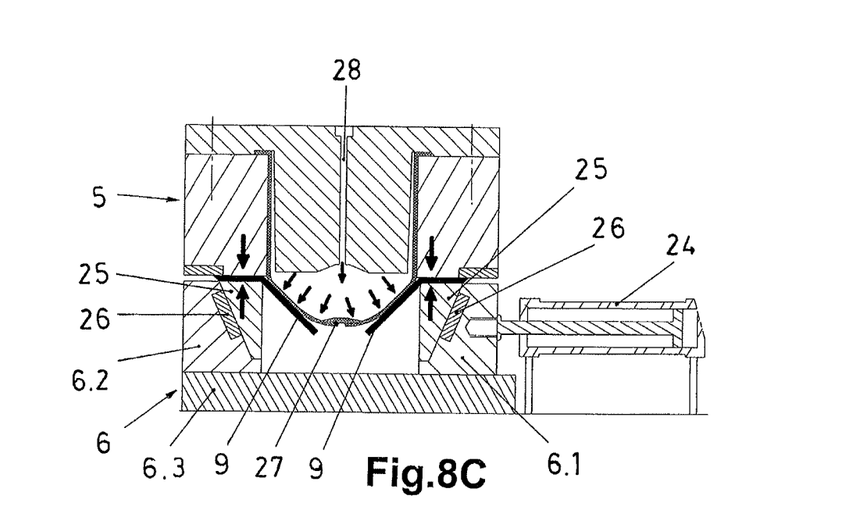

Once this is done, pneumatic pressure is injected through the conduit (28) of the male configured tool (5), making the membrane (27) expand forwards, the membrane forcing the side parts of the fibre laminate (9) to fold towards the inside of the channel (23) of the female configured tool (6), as seen in FIG. 8C.

Figure 8D:
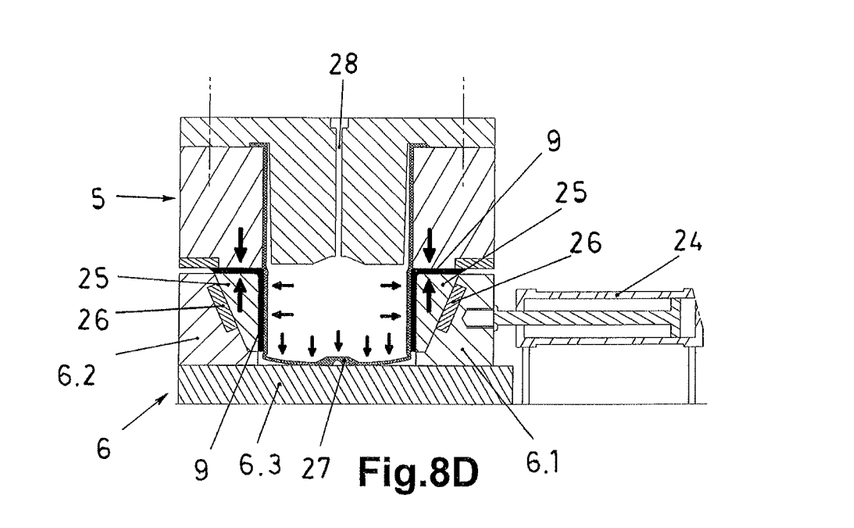

Therefore, when the membrane (27) fills the entire channel (23), the side parts of the fibre laminate (9) are bent in the form of an L on the inserts (25) of the side parts (6.1 and 6.2) of the female configured tool (6), as seen in FIG. 8D.

Figure 8E:
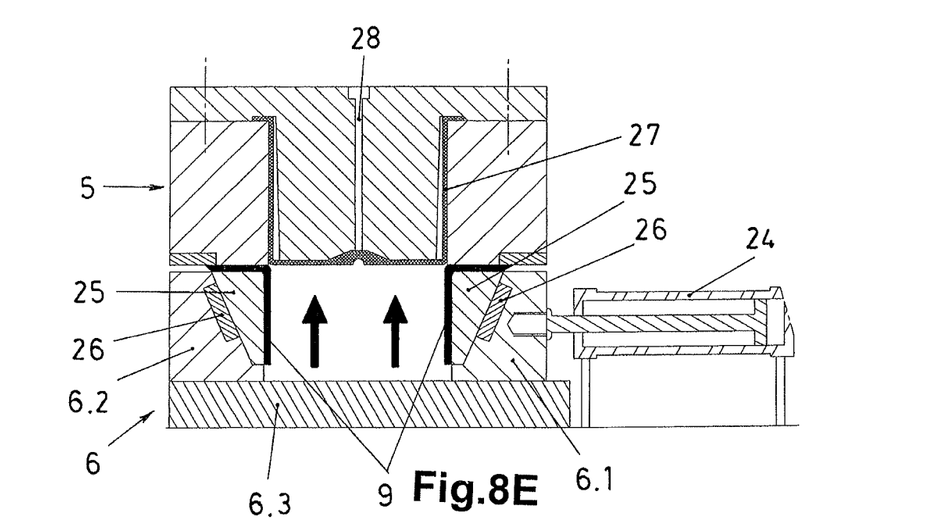

Then the injection of pneumatic pressure through the conduit (28) is stopped, whereby the membrane (27) is retracted on the male configured tool (5), the L-shaped sections of the fibre laminate (9) being formed on the side parts (6.1 and 6.2) of the female configured tool (6), as shows FIG. 8E.

Figure 8F:
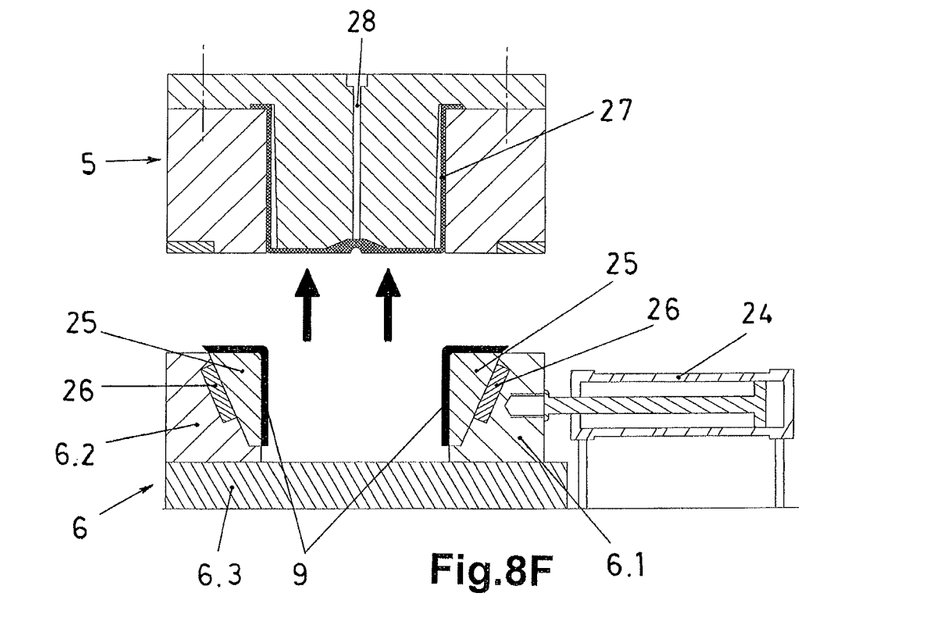
Figure 8G:
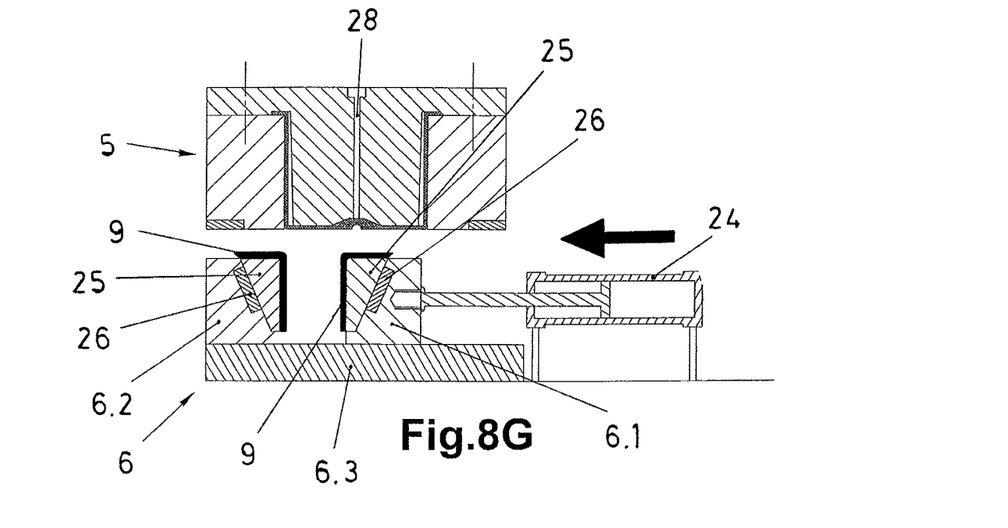
Figure 8H:
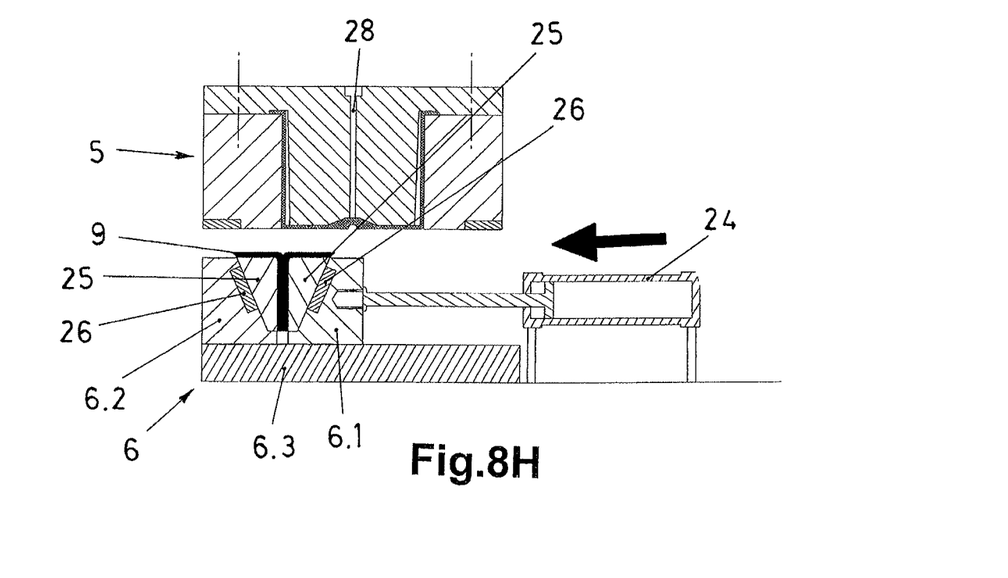

Next the male configured tool (5) and the female configured tool (6) are separated once again, as FIG. 8F shows, and the side parts (6.1 and 6.2) of the female configured tool (6) are moved closer together, as shown in FIG. 8G, until the L-shaped halves of the fibre laminate (9) are attached to each other forming a T-shaped assembly, as seen in FIG. 8H.

Figure 9A:
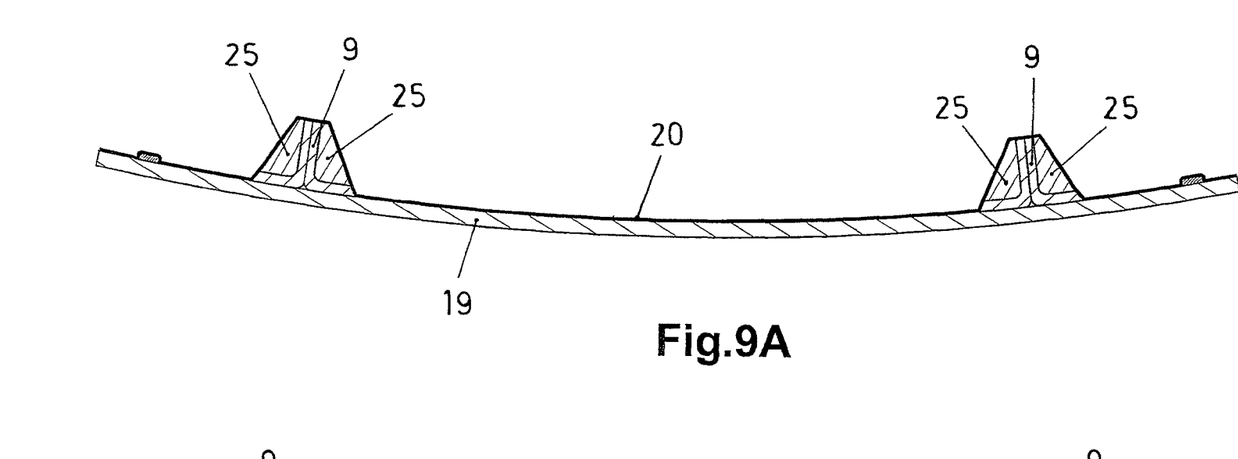
FIGS. 9A and 9B show a practical way of fixing the T-shaped fibre stringers on a structure of application.
Figure 9B:
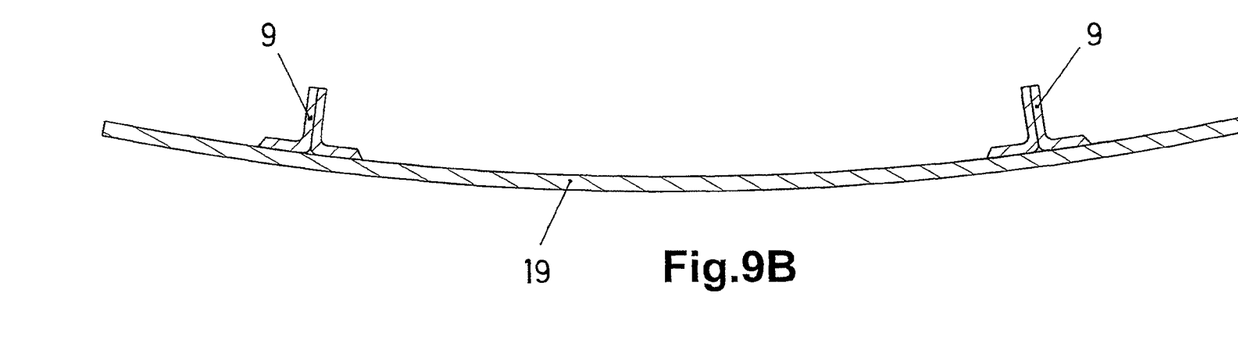

Once this is done, by means of separating the side parts (6.1 and 6.2) of the female configured tool (6) once again and deactivating the electromagnets (26), the T-shaped assembly formed by the attached parts of the fibre laminate (9), together with the inserts (25), can be removed for incorporating the T-shaped assembly formed by the attached parts of the fibre laminate (9) as a reinforcement stringer on a structure (19) of application, where it can be glued, for example, by means of pressure with a sheet (20) on that T-shaped assembly together with the inserts (25) still associated with it, as seen in FIG. 9A, applying a vacuum between the sheet (20) and the panel (19), the sheet (20) and the inserts (25) then being removed after an autoclave resin curing process, as seen in FIG. 9B.

Figure 1:
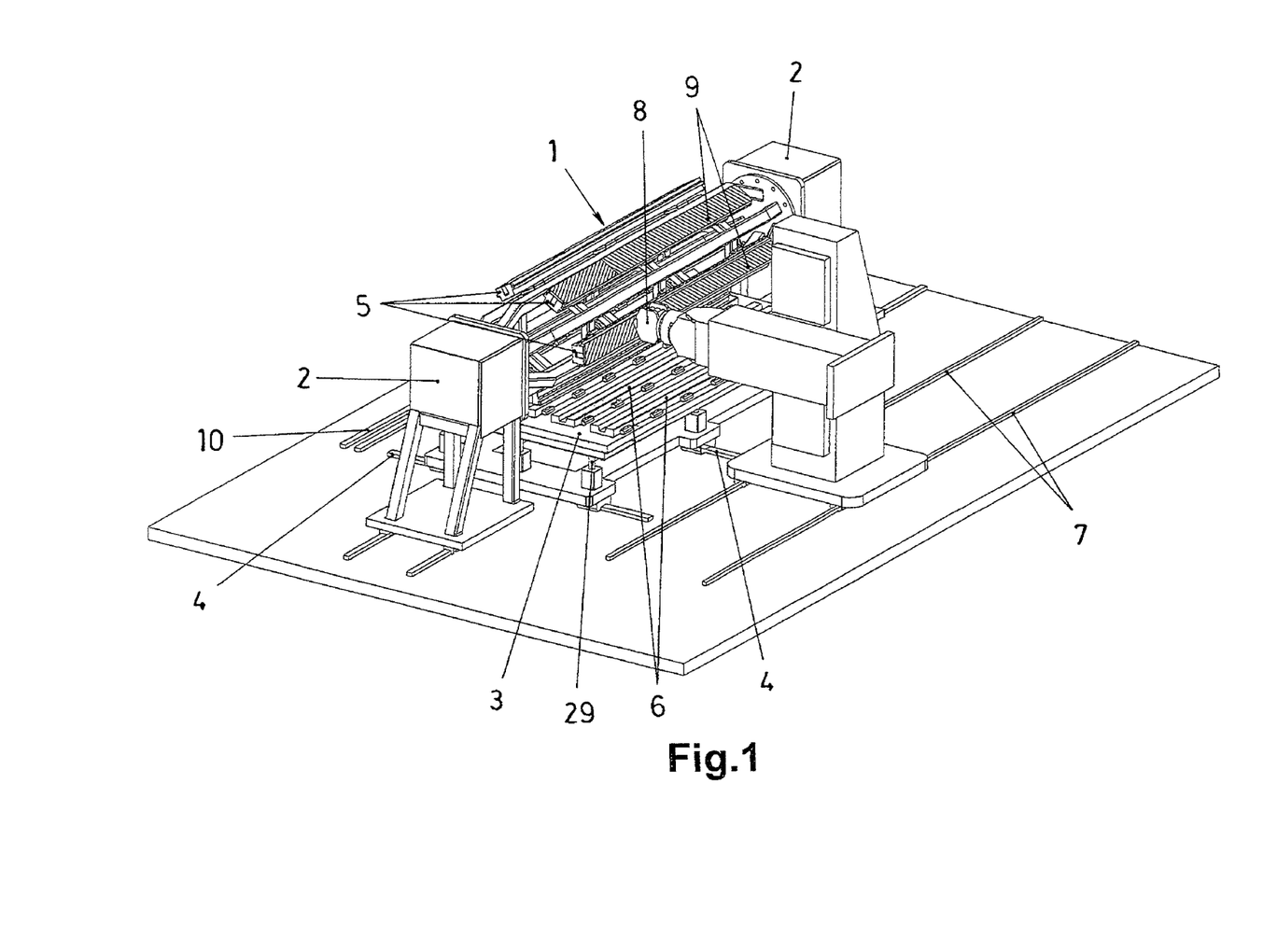
FIG. 1 shows a perspective view of an installation for making fibre stringers according to the invention, in an embodiment with a single rotating carousel carrying male configured tools.
Figure 2:
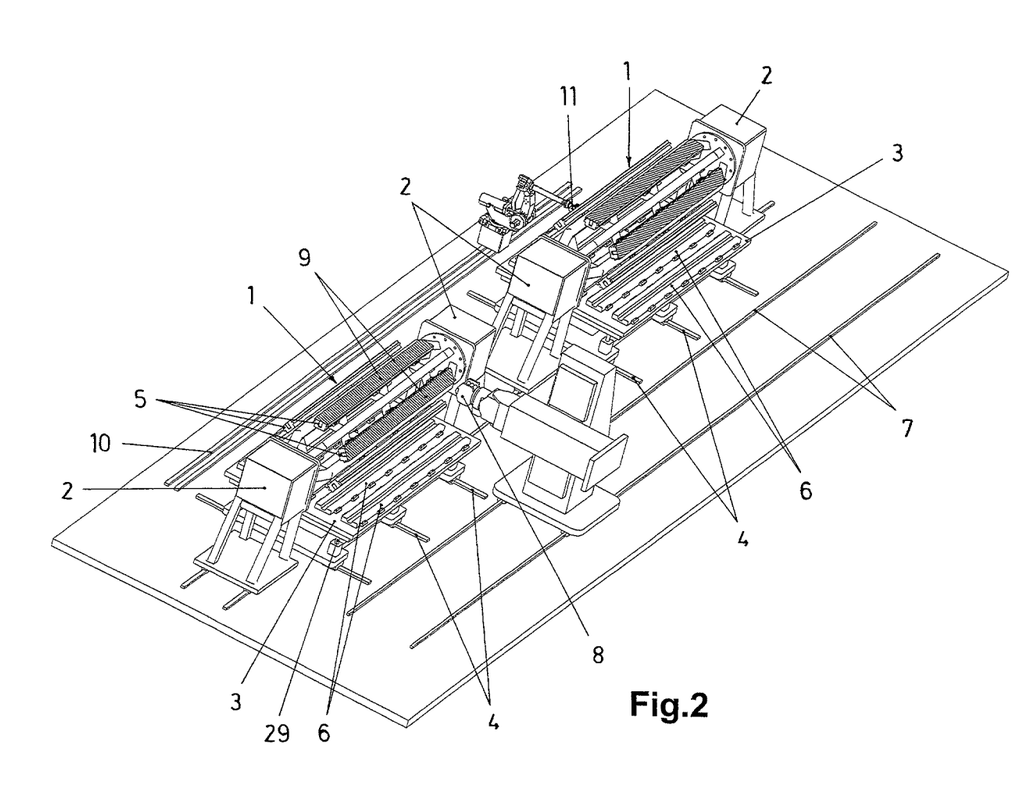
FIG. 2 shows a perspective view of an installation according to the invention with two rotating carousels carrying male configured tools for making omega-shaped stringers.
Figure 3:
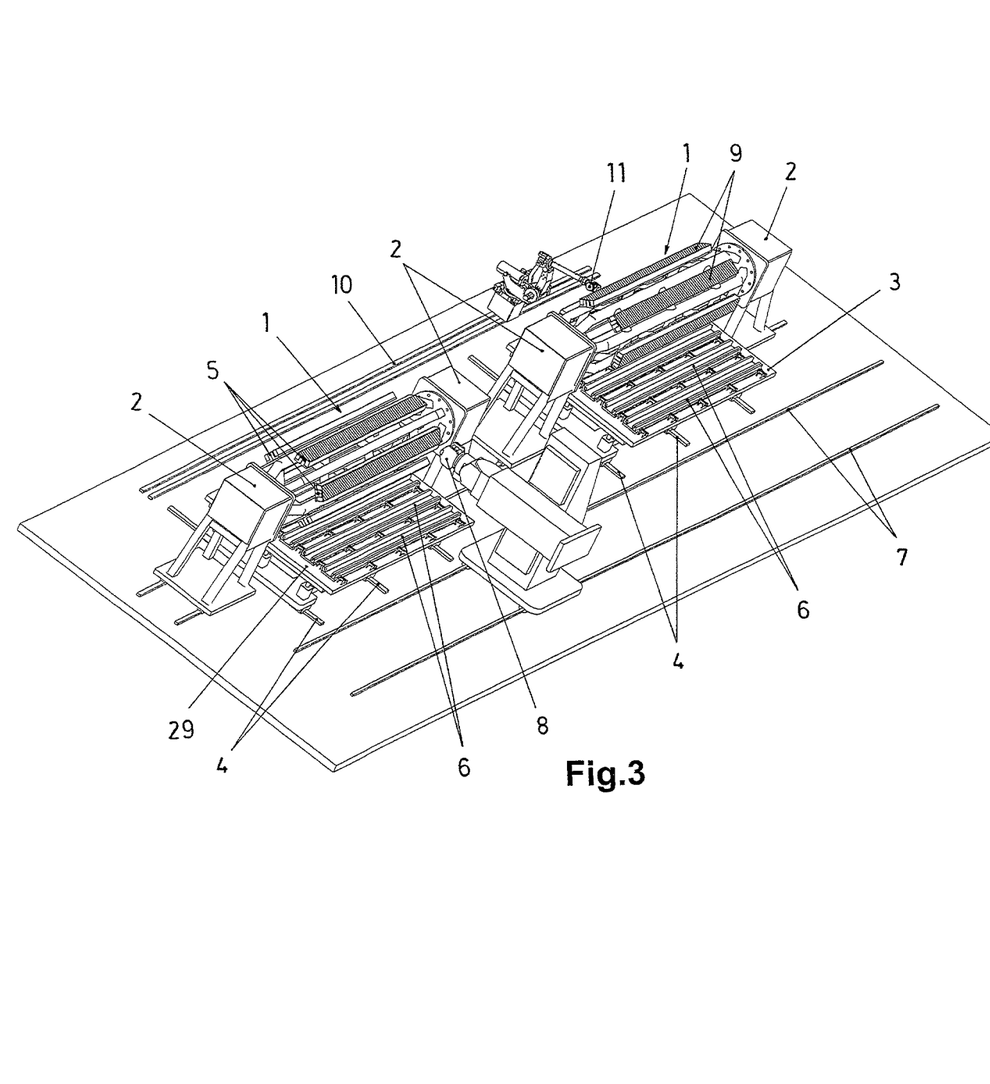
FIG. 3 shows a perspective view of an installation according to the invention with two rotating carousels carrying male configured tools for making T-shaped stringers.
Figure 4:
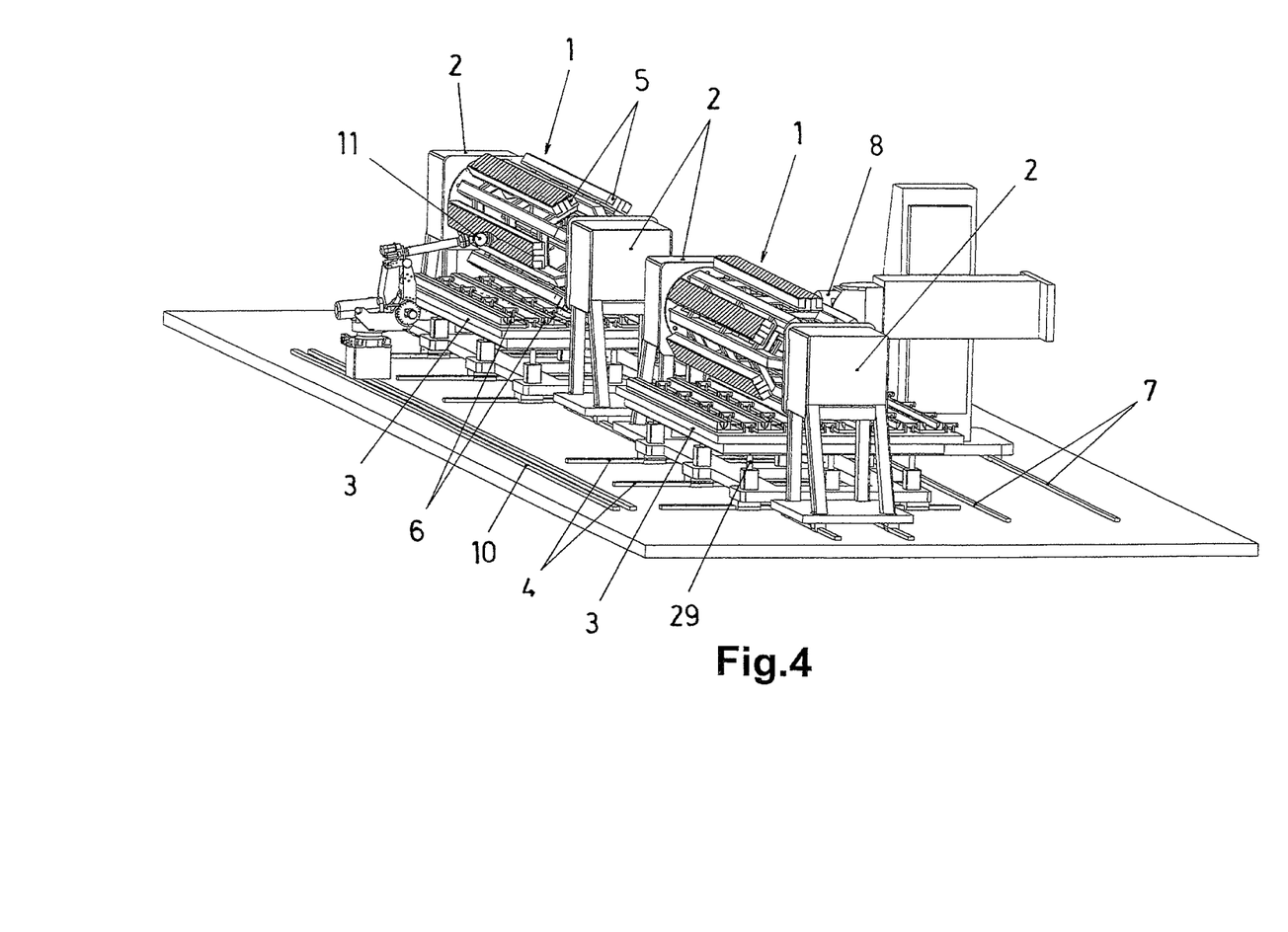
FIG. 4 is a perspective view of the installation of FIG. 3 seen from the other side.
Figure 5:
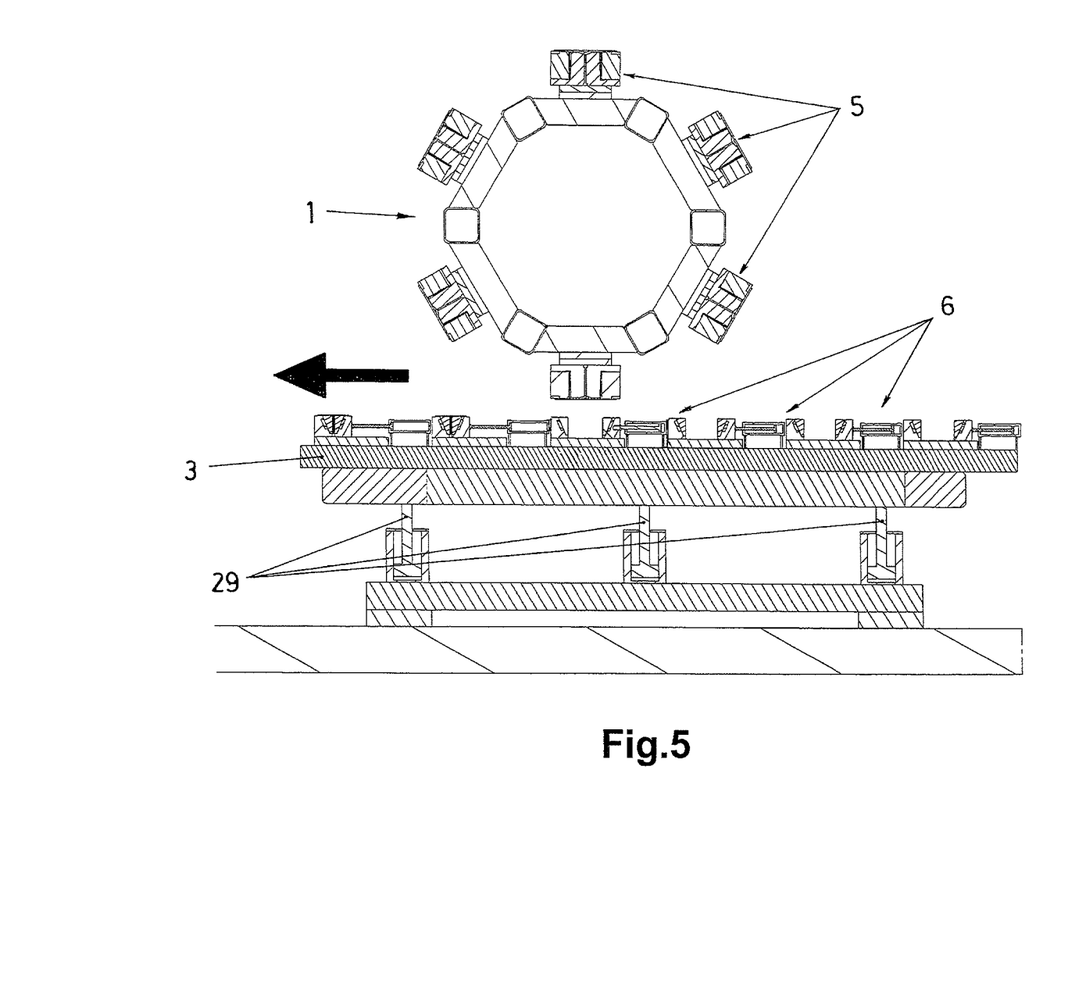
FIG. 5 is a cross-sectional view of said installation of FIG. 3.

Basically, the proposed installation for making both the omega-shaped and T-shaped stringers can be formed (FIG. 1) by a single carousel (1) and, in relation to it, a bed (3), a fibre strip applicator head (8) arranged on one side and a cutting head (11) arranged on the other side; but also, and without altering the concept of the invention, the installation can comprise two or more carousels (1) arranged longitudinally one after the other (FIGS. 2, 3 and 4), having a fibre strip applicator head (8) and a cutting head (11) that can act on any of the carousels (1), and in relation to the different carousels (1), a common bed (3) carrying a distribution of female configured tools (6), or different beds (3) carrying respective distributions of female configured tools (6), with respect to the different carousels (1).

According to a practical embodiment corresponding with the depiction of the drawings, the relative movement of the bed or beds (3) and the carousel or carousels (1) coming closer to one another is determined by means of mounting the bed or beds (3) on lifting actuators (29), the carousel or carousels (1) remaining at a fixed height,; but this embodiment is not limiting because both the bed or beds (3) and carousel or carousels (1) can be mounted for vertical movement individually or together with one another, without this altering the concept of the invention.

The invention claimed is:

1. An installation for manufacturing fibre stringers for aerospace structures for making omega-shaped or T-shaped fibre stringers intended for being fixed as reinforcements on structures of application, comprising:
    at least one swivel-mounted cylindrical carousel peripherally incorporating a distribution of male configured tools, and in relation to said carousel a bed capable of lateral movement, incorporating a distribution of female configured tools, a fibre strip applicator head for making fibre laminates on the male configured tools of the carousel being arranged on a side of that assembly formed by the carousel and the bed, which fibre laminates are made in determination of omega-shaped or T-shaped stringers by means of the interaction of each male configured tool of the carousel in relation to a respective female configured tool of the bed.

2. The installation for manufacturing fibre stringers for aerospace structures according to claim 1, wherein a cutting head is arranged on one side of the assembly formed by the carousel and the bed by means of which the fibre laminates applied on the male configured tools of the carousel are longitudinally cut into two halves for making T-shaped stringers by means of attaching two L-shaped halves of said fibre laminates.

3. The installation for manufacturing fibre stringers for aerospace structures according to claim 2, wherein:
    for making T-shaped stringers, the female configured tools in the bed comprise two independent side parts determining a channel between each other, from said side parts being mounted for being moved closer to and separated from each other on a base; while the male configured tools in the carousel comprise a block incorporating a membrane in the front part, said block having a conduit in the central area for injecting pneumatic pressure forcing the membrane to expand forwards; and
    the side parts of the female configured tool incorporate inserts which are secured by means of electromagnets, on which inserts the halves of the fibre laminate applied on the corresponding male configured tool and longitudinally divided by means of the cutting head are formed in L-shape.

4. The installation for manufacturing fibre stringers for aerospace structures according to claim 1, wherein the carousel is swivel-mounted between end supports.

5. The installation for manufacturing fibre stringers for aerospace structures according to claim 1, wherein the bed is mounted for lateral movement on cross-guides and mounted for vertical movement on lifting actuators.

6. The installation for manufacturing fibre stringers for aerospace structures according to claim 1, wherein two or more consecutive carousels are arranged longitudinally, and in relation to them a bed with a distribution of female configured tools common for all the carousels, or independent beds with respective distributions of female configured tools with respect to each one of the carousels are arranged.

7. The installation for manufacturing fibre stringers for aerospace structures according to claim 1, wherein the female configured tools in the bed for making omega-shaped stringers comprise a profile determining a longitudinal channel; while the male configured tools in the carousel comprise a profile determining a channel in which there is housed a bar that can be pushed outwardly by a pneumatic actuator, there being arranged in the front part where the bar exits a membrane secured by the side edges which is pushed by the bar when the bar exits the profile.

8. The installation for manufacturing fibre stringers for aerospace structures according to claim 7, wherein the bar has a conduit communicating with a through hole through the membrane for applying a fibre laminate retaining vacuum; while the profile has on the sides of the channel conduits for projecting thrusting compressed air favouring the adaptation of the fibre laminate on the wall of the channel of the female configured tool.

9. The installation for manufacturing fibre stringers for aerospace structures according to claim 1, wherein for making T-shaped stringers, the female configured tools in the bed comprise two independent side parts determining a channel between each other, from said side parts being mounted for being moved closer to and separated from each other on a base; while the male configured tools in the carousel comprise a block incorporating a membrane in the front part, said block having a conduit in the central area for injecting pneumatic pressure forcing the membrane to expand forwards.

* * * * *